May 31, 1960   J. T. L. BROWN ET AL   2,938,982
RELAY FOR SWITCHING CONNECTIONS BETWEEN THREE
CONDUCTORS MEETING AT A COMMON POINT
Filed Dec. 31, 1958   2 Sheets-Sheet 1
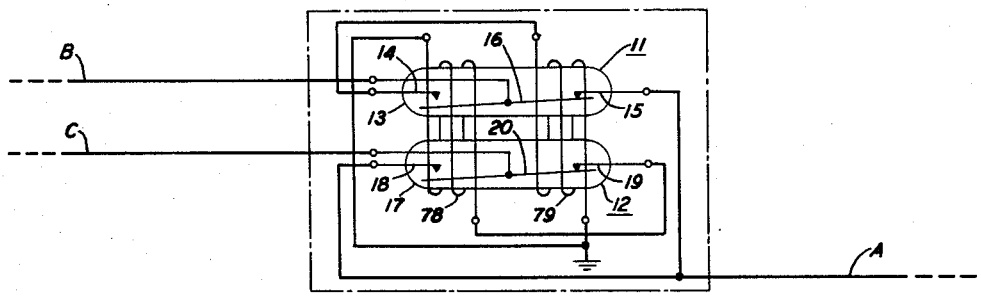
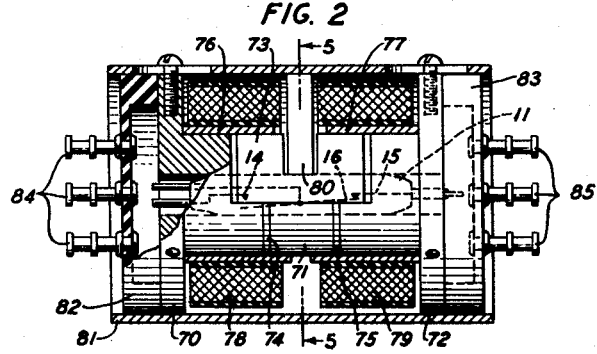
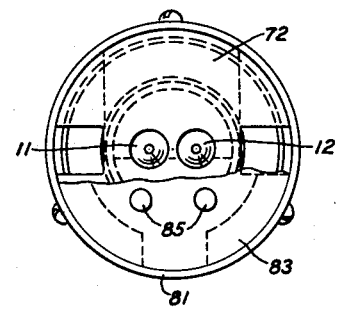
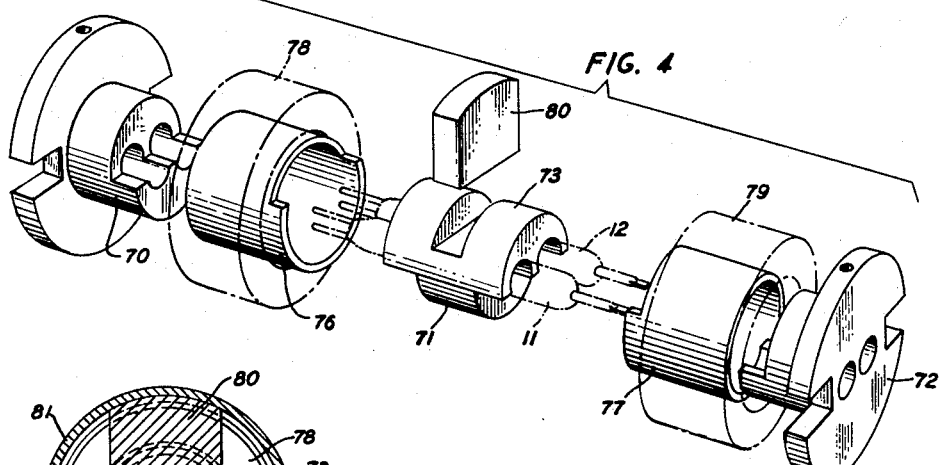
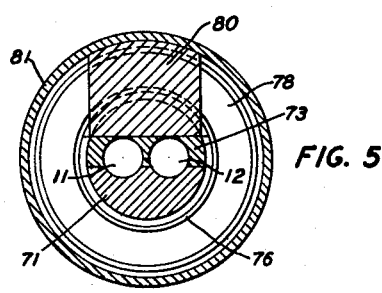
INVENTORS J. T. L. BROWN
W. G. GUSTAFSON
BY John C. Morris
ATTORNEY May 31, 1960 J. T. L. BROWN ET AL 2,938,982
RELAY FOR SWITCHING CONNECTIONS BETWEEN THREE
CONDUCTORS MEETING AT A COMMON POINT
Filed Dec. 31, 1958 2 Sheets-Sheet 2
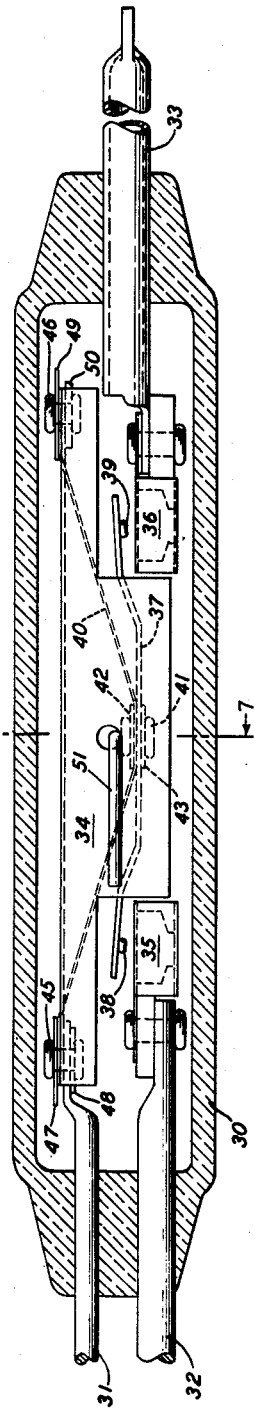
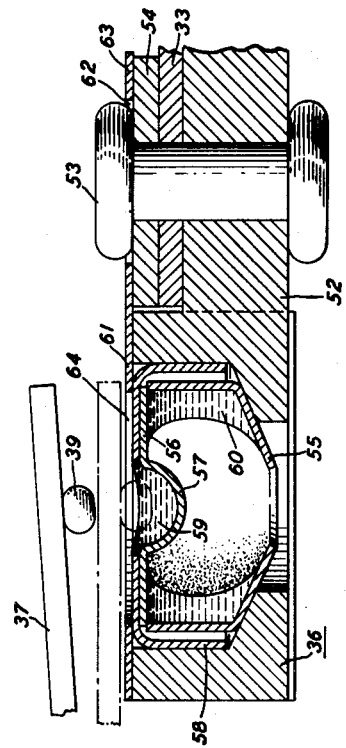
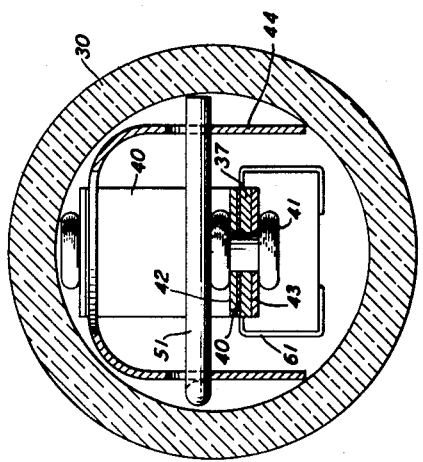
INVENTORS J. T. L. BROWN
W. G. GUSTAFSON
BY
John C. Morris
ATTORNEY

United States Patent Office 2,938,982
Patented May 31, 1960

2,938,982

RELAY FOR SWITCHING CONNECTIONS BETWEEN THREE CONDUCTORS MEETING AT A COMMON POINT

John T. L. Brown, Short Hills, N.J., and Walter G. Gustafson, New York, N.Y., assignors to Bell Telephone Laboratories, Incorporated, New York, N.Y., a corporation of New York Filed Dec. 31, 1958, Ser. No. 784,380

9 Claims. (Cl. 200—112)

This invention relates in general to electrical transmission devices. More particularly, it relates to a relay for switching connections between three conductors meeting at a common point to form a Y junction.

It is contemplated that the various features of this invention will be useful in electrical transmission systems of many different types. However, for the purpose of illustration the invention is described herein as adapted to a submarine cable system.

In submarine cable systems, damage to the cable occurs most frequently in relatively shallow water. There fishermen in the process of trawling may snare the cable, icebergs may run aground on the cable, or earthquakes may cause movements of rock and sediment that carry a portion of the cable away. In addition to offering these dangers, shallow water is subject to ice conditions that may delay repair of the cable for several months.

One solution of this problem is to use two branch cables in relatively shallow water and join them to a single or main cable in deeper water. By joining the three cables so that the main cable may be switched from one or the other of the branch cables, a spare cable is available in the danger zone. If the branch cables are spaced at some distance apart, the possibility of both being damaged at the same time is very slight, and when one branch cable is damaged, the main cable is connected to the operative branch cable, allowing repair of the inoperative branch cable when conditions are favorable.

It has been found, as disclosed in Patent 2,504,092 issued to O. B. Jacobs on April 18, 1950, that a transmission system including a series of nonpolar relays may be used to accomplish the desired switching operation. While Jacobs discloses a satisfactory switching means, a simpler device is more desirable. A simpler device offers less chance for mulfunctions and this is a very important factor in submarine cables since repair of the cable is extremely expensive.

Thus, an object of this invention is to provide a single relay which permits simple and reliable switching of the power connection of a main cable from one branch cable to another branch cable.

This and other objects of the present invention are realized in an illustrative embodiment thereof wherein the relay includes two switch units placed side by side. Each switch unit comprises a switch envelope enclosing two fixed contacts and an armature rotatively mounted at its center. Contact faces secured to the ends of the armature are in juxtaposition with the fixed contacts and engage one or the other of the contacts depending upon the direction of rotation of the armature.

A permanent magnet extends radially from the switch units and a magnetic shunt substantially encloses the switch units. A short-circuited turn encircles each end of the magnetic shunt and a winding encompasses each short-circuited turn.

In accordance with one feature of this invention, at all times one switch unit of the relay connects the main cable to one branch cable, while the other switch unit connects the remaining branch cable to a relay winding.

In accordance with another feature of this invention, the branch cable connected to a relay winding actuates the relay to switch the connection of the main cable. Power is first removed from the main cable and then the branch cable energizes the winding so as to cause the switch armatures to change position.

In accordance with a further feature of this invention, the magnetic shunt elements and the short-circuited turn assure a completed switching operation. These members make it necessary for the energized relay winding to generate a large amount of magnetic flux before sufficient flux is produced to cause the switch armatures to change position. When the armatures do commence to move, these same members retard the rate of flux decay so that the armatures move to new positions even though the movement of the armatures de-energizes the actuating relay winding.

A complete understanding of the invention and of these and other features and advantages thereof may be gained from consideration of the following detailed description taken in conjunction with the accompanying drawing wherein one embodiment of the invention is illustrated. It is to be expressly understood that the drawing is for the purposes of the illustration and description and is not to be construed as defining the limits of the invention.

In the drawing:

Fig. 1 is a schematic representation of the relay of this invention joined to three cables meeting at a common point;

Fig. 2 is a front view of the relay partly in section;

Fig. 3 is a side view of the relay partly in section;

Fig. 4 is an exploded perspective view of the relay, showing some of the elements in phantom;

Fig. 5 is a vertical section of the relay shown in Fig. 2, taken along the line 5—5 and looking in the direction of the arrows;

Fig. 6 is a front view of the relay switch unit partly in section;

Fig. 7 is an enlarged vertical section of the switch unit shown in Fig. 6, taken along the line 7—7 and looking in the direction of the arrows; and Fig. 8 is an enlarged view partly in section of a portion of the switch unit shown in Fig. 6.

Referring to Fig. 1 of the drawing, there are shown a main cable A and two branch cables B and C, connected to a relay 10 that includes switch units 11 and 12. Switch unit 11 comprises a switch envelope 13 enclosing fixed contacts 14 and 15 and a rotatively mounted armature 16. Similarly, switch unit 12 comprises a switch envelope 17 enclosing fixed contacts 18 and 19 and a rotatively mounted armature 20. The fixed contacts are positioned adjacent to each end of the armature so that rotation of the armature in either direction closes one of the contacts.

Although the switch units may be of any suitable type, a preferred embodiment, a mercury switch, is illustrated in Figs. 6–8. As shown therein the elements of each switch unit are enclosed in an envelope 30 made of dielectric material such as glass. In order to suppress contact arcing, the envelope may be filled with an inert gas such as hydrogen, though this is not essential for the operation of the switch unit. Inserted in the ends of the envelope are electrodes 31, 32, and 33. These electrodes should be made of a material having good conductivity and a coefficient of expansion approximating that of the material of the envelope. As shown in Fig. 6, the electrode 33 is partly tubular in shape, thereby facilitating fabrication of the switch unit, since both mercury and an inert gas may be inserted into the envelope through this electrode.

Respectively secured to the electrodes 31, 32, and 33 are an armature bracket assembly 34 and mercury cup assemblies 35 and 36. The armature bracket assembly includes an armature 37 having round contact faces 38 and 39 secured to its ends by any well-known means such as spot welding. The armature is formed from a material, such as Permalloy, that has high permeability and a low hysteresis loss. The contact faces are advantageously fabricated from platinum, thereby providing a surface that readily wets with mercury.

The armature 37 is supported by a spring member 40 that permits the armature to rotate but tends to maintain it in the neutral position shown in Fig. 6. The armature is secured to the spring member by a rivet 41, and spacers 42 and 43 are interposed adjacent the heads of the rivet to protect the armature and spring member from deformation. The spring member is made from a resilient, nonmagnetic material, such as AISI 310 stainless steel.

The ends of the spring member 40 are secured to a bracket 44 by rivets 45 and 46. Spacers 47, 48, 49, and 50 are interposed adjacent the rivet heads to protect the spring member from deformation. The bracket is made of a nonmagnetic material, and it should be made of the same material used for the spring member since this will prevent relative expansion or contraction due to changes in temperature from changing the location of the armature. As shown in Fig. 7, the bracket is U shaped, and it fits snugly within the envelope 30. Thus the bracket is held firmly in place inside of the envelope, and the armature bracket assembly is protected against external shock.

Extending through apertures in the sides of the bracket 44 is a right-angle stop wire 51. The stop wire protects the spring member and armature against lateral deflection due to external shock.

Turning now to Fig. 8, the cup assembly 36 of the switch unit includes a cup holder 52 that is secured to the electrode 33 by means of rivet 53. A spacer 54 is interposed between the electrode and the upper head of the rivet to prevent deformation. The cup holder is fabricated from a material, like Permalloy, that has high permeability and a low hysteresis loss.

A funnel-shaped wall 55 is inserted inside of the cup holder 52, and suspended on the wall is a circular plate 56 having a cup portion 57. A centrally apertured cover 58 fits over the wall and inside of the cup holder. The aperture in the cover is in register with the cup portion of the circular plate, permitting a contact face to enter through the aperture and engage the mercury in the cup.

The cup members inserted into the cup holder 52 are all formed from a mercury wettable material such as platinum thereby providing surfaces to which mercury will adhere. When a drop of mercury strikes the top surface of the cup 58, capillary forces and surface tension cause it to take the position and shape shown in Fig. 8. The mercury pool 59 in the cup portion 57 of the circular plate 56 is quite stable, its level changing very little with any change in the mercury surface 60 inside of the cup members. Furthermore, the particular configuration of the cup members and the adherence of mercury thereto makes it very difficult to displace the mercury either by jarring or inversion of the switch unit. Consequently, the switch may be mounted for operation in any position.

The cup members are held in place by a clamping member 61, a rectangular sleeve which substantially encloses the top and sides of the cup holder 52 and biases itself against the bottom of the cup holder. The clamping member is slid longitudinally over the cup holder and when it is properly positioned an aperture 62 in a tongue portion 63 seats over the upper head of the rivet 53 placing an aperture 62 in juxtaposition with the cup portion of the cup members.

The cup assembly 35 is practically identical to the cup assembly 36 the only differences being a change in the configuration of the cup holder due to the change in configuration of the supporting electrode.

All of the metal members of the switch unit, except for those made of a mercury wettable material, such as platinum, may be advantageously covered with a chromium oxide to provide a surface that does not wet with mercury. The chromium oxide is obtained by applying a flash of chromium to the member and annealing it in wet hydrogen. If a member is made from a material, such as stainless steel that has chromium in it, the flash of chromium is unnecessary.

After several operations of the switch units the round contacts 38 and 39 retain a film of mercury thereon. This provides a low resistance mercury-to-mercury electrical contact when one of the contacts closes. In addition, because the mercury adheres to a large portion of the round contacts when a contact opens, the mercury tends to bridge between the contact and the mercury pool maintaining an electrical contact through a large portion of the movement of the contact away from the cup.

Referring now to Figs. 2-5 it is seen that the switch units are received by magnetic shunt elements 70, 71, and 72, and a spacer 73. These elements substantially enclose the switch units and maintain them a spaced distance apart. The shunt elements are spaced to provide gaps 74 and 75 adjacent to the gaps in the switch units between the ends of the armature and the fixed contacts. The shunt elements are made of a low reluctance magnetic material, such as magnetic iron while the spacer is made of a nonmagnetic material such as brass.

Short-circuiting sleeves 76 and 77 encircle the ends of the shunt elements and the spacer, enclosing both the gaps in the shunt and the gaps in the switch units, and windings 78 and 79 encompass the short-circuiting sleeves. A permanent magnet 80 extends radially from the center of the spacer, projecting between the short-circuiting sleeves and the windings. The short-circuiting sleeves are formed from a nonmagnetic, low resistance material, such as copper.

A hollow cylinder 81 houses the relay members and forms a return path for the magnetic flux. It is therefore made of a magnetic material, such as magnetic iron. Dielectric terminal plates 82 and 83 seal the end of the cylinder and provide terminals 84 and 85 by means of which connections between the cable members and the relay are made.

Referring again to Fig. 1, it is seen that the main cable A is electrically connected to both the fixed contact 15 of the switch unit 11 and the fixed contact 18 of the switch unit 12. The branch cable B is electrically connected to the armature 16, and the branch cable C is electrically connected to the armature 20. Electrically connected to the remaining fixed contacts 14 and 19 is an end of each of the windings 78 and 79, respectively. The other end of each winding is connected to ground. With the armatures rotated in the manner shown, the switch unit 11 connects the main cable A to the branch cable B, while the switch unit 12 connects the branch cable C to the winding 78. With the armatures rotated in the opposite direction the switch unit 11 connects the branch cable B to the winding 79 while the switch unit 12 connects the main cable A to the branch cable C. The relay is assembled with both of the armatures in one position or the other.

Other details will be understood from the following description of the mode of operation of the relay.

The permanent magnet 80 generates magnetic flux that flows in two parallel paths. As viewed in Fig. 2, one path proceeds from the lower end of the magnet, through the left end of the armature 16, across the gap between the armature and the contact 14, through the contact, along the upper portion of the shunt element 70, through the upper left portion of the cover 81, and back to the upper end of the magnet to complete one magnetic circuit. The other of these paths proceeds in a direction from the bottom of the magnet, through the right end of the armature 16, across the gap between the armature and the contact 15, through the contact, along the upper portion of the shunt element 72, through the upper right portion of the cover 81 and back to the upper end of the magnet to complete the second magnetic circuit. Because the closed contact 15 offers far less reluctance than the gap between the left end of the armature 16 and the contact 14, much more flux flows through the second path than the first path, and this flux is sufficient to maintain the armature closed with the contact 15 even though the armature is biased toward a neutral position. Identical flux paths flow through the switch unit 12 maintaining the armature 20 closed with the contact 19. As a safety measure, the branch cable C may energize the winding 78 so as to aid the flux flowing in the second path and oppose the flux flowing in the first path, thus assuring that the armatures will remain in their respective positions.

When it is desirable to connect the main cable A to the branch cable C, power is removed from the main cable, and the cable C energizes the winding 78 so as to add to the first flux path generated by the permanent magnet 80. Practically all of the flux generated by the winding flows through the low reluctance path offered by the shunt elements; that is, the flux flows from the right end of the winding 78, through the lower right portion of the cover 81, along the lower portion of the shunt element 72, across the shunt gap 75, through the shunt element 71, across the shunt gap 74, along the lower portion of the shunt element 70, and back to the left side of the winding to complete the circuit. Examining this shunt path it is seen that the greatest reluctance in the path is across the shunt gaps 74 and 75. Therefore, most of the magnetomotive force will divide itself between these two gaps. As the magnetomotive force across the gaps increases, it commences to affect the magnetomotive force across the adjacent switch gaps. The magnetomotive force across the gap 74 aids the magnetomotive force generated by the permanent magnet across the gap between the left end of the armature 16 and the contact 14, while the magnetomotive force across the gap 75 opposes the magnetomotive force generated by the permanent magnet across the gap between the right end of the armature 16 and the contact 15. As the permanent magnet exerts a relatively large magnetic force, it is necessary for the winding 78 to build up a fairly large magnetomotive force across the gaps before a point is reached where the magnetomotive force across the gap between the left end of the armature 16 and the contact 15 combined with the biasing force of the spring member to which the armature is mounted overcomes the magnetic force between the right end of the armature 16 and the contact 15. When this point is reached, the armature will start to rotate in a clockwise direction.

All that has been stated with regard to the switch unit 11 also applies to switch unit 12. The armature 20 will also start to rotate in a clockwise direction. However, because the armature 20 connects the branch cable C to the winding 78, such rotation de-energizes the winding 78. It is, therefore, desirable to have the armature 20 rotate later than the armature 16. In a like manner, when the armatures have been rotated to the opposite positions, it is desirable to have the armature 16 rotate in a counterclockwise direction later than the armature 20. This may be accomplished by one or more of the following methods:

(1) Changing the location of the gaps in the magnetic shunt with respect to the gaps of the switch units;

(2) Making one of the shunt gaps larger than the other;

(3) Using switch units which are more sensitive in one direction than the other; and (4) Changing the strength and location of the permanent magnet.

Once the armatures do commence to rotate, as previously explained, a bridge of mercury is formed between the mercury wettable round contact faces and the mercury filled cups, maintaining the circuits in a closed condition through a portion of the armature's rotation.

When the winding 78 is de-energized, the flux stored in the shunt elements commences to decay. A time lag in this flux decay is introduced by means of the short-circuiting sleeve 76. The decreasing magnetic flux induces a transient current of high value in the short-circuiting sleeve that opposes the decrease of flux in the shunt elements. Thus the magnetic flux is maintained at a high level for an extended period of time.

The magnetomotive force required to continue the rotation of the armatures once they have started to rotate decreases as the gaps between the left ends of the armatures and the fixed contacts decreases, since the reluctance of the gaps decreases and the flux in the gaps increases. Because of the slow rate of flux decay, the magnetomotive force across the shunt gaps is always greater than that required to continue the rotation of the armatures and the armatures therefore rotate to new positions. The armature 16 closes with contact 14 and the armature 20 closes with contact 18, connecting the main cable A to the branch cable C and the branch cable B to the winding 79. It will be seen that cable B can now be used to switch the connection of the main cable in the same manner described for cable C.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A relay comprising in combination a first and second switching means, each of said switching means including an elongated tubular glass envelope, a first and second electrode extending through one end of said envelope and a third electrode extending through the other end of said envelope, a U-shaped bracket member secured to said first electrode, the ends of a spring member secured to said bracket member, an armature rotatively mounted at its center to the center of said spring member, a round platinum contact face secured to each end of said armature, a mercury-filled cup secured to each of said second and third electrodes, said mercury-filled cups being in juxtaposition with said contact faces so that rotation of said armature in either direction causes one of said contact faces to engage the mercury in its juxtaposed cup, magnetic shunt elements enclosing said first and second switching means, said magnetic shunt elements having gaps adjacent to the mercury-filled cups of said switching means, a copper sleeve encircling each gap in said magnetic shunt elements, an energizing winding encompassing each of said copper sleeves, and a permanent magnet extending radially from a central location on said switching means.

2. A relay comprising in combination a first and second switching means, each of said switching means including an elongated tubular dielectric envelope, a first and second electrode extending through one end of said envelope, and a third electrode extending through the other end of said envelope, a bracket member secured to said first electrode, a resilient member secured to said bracket, an armature rotatively mounted at its center to said resilient member, a round mercury wettable contact face secured to each end of said armature, a mercury-filled cup secured to each of said second and third electrodes, said mercury-filled cups being in juxtaposition with said contacts so that rotation of said armature in either direction causes one of said contacts to engage its juxtaposed mercury cup, magnetic shunt elements disposed about said first and second switching means, said magnetic shunt elements having gaps adjacent to the mercury-filled cups of said switching means, a nonmagnetic electrically conductive sleeve encircling each gap in said magnetic shunt elements, said switching means, a winding encompassing each of said nonmagnetic electrically conductive sleeves, and a permanent magnet extending radially from a central location on said switching means.

3. A relay comprising in combination a first and second switching means, each of said switching means including a dielectric envelope, a first and second electrode extending through one end of said envelope, and a third electrode extending through the other end of said envelope, a support means secured to said first electrode, an armature rotatively mounted at its center to said support means, a round mercury wettable contact face secured to each end of said armature, a mercury-filled cup secured to each of said second and third electrodes, said mercury-filled cups being in juxtaposition with said contacts so that rotation of said armature in either direction causes one of said contacts to engage the mercury in its juxtaposed cup, magnetic shunt elements disposed about said first and second switching means, said magnetic shunt elements having gaps adjacent to the mercury-filled cups of said switching means, a closed electrical conducting path disposed about each gap in said magnetic shunt elements, a magnetic flux generating means encompassing each of said conducting paths, and a permanent magnet extending radially from said switching means.

4. A relay comprising in combination a first and second switching means, each of said switching means including an armature means for rotatively supporting said armature so that it is unaffected by the orientation of said switching means, a mercury wettable contact face secured to each end of said armature, a mercury-filled cup positioned in juxtaposition with each of said contact faces so that rotation of said armature in either direction causes one of said contact faces to engage the mercury in its juxtaposed cup, magnetic shunt elements disposed about said first and second switching means, said magnetic shunt elements having gaps adjacent to the mercury-filled cups of said switching means, flux decay retarding means disposed about the gaps in said magnetic shunt elements, magnetic flux generating means disposed about said flux decay retarding means, and a permanent magnet extending radially from said switching means.

5. A relay comprising in combination a first and second switching means, each of said switching means including an armature rotatively mounted at its center, contact faces secured to each end of said armature, a fixed contact positioned in juxtaposition with said contact faces so that rotation of said armature in either direction causes one of said contact faces to engage the mercury in its juxtaposed cup, magnetic shunt elements disposed about said first and second switching means, said magnetic shunt elements having gaps adjacent the gaps in the switching means, flux decay retarding means disposed about said magnetic shunt elements, magnetic flux generating means disposed about said flux decay retarding means, and polarizing means extending radially from said switching means.

6. A relay comprising in combination a first and second switching means, each of said switching means including an armature rotatively mounted at its center, a fixed contact positioned in juxtaposition with each end of said armature, magnetic shunt elements disposed about said first and second switching means, flux decay retarding means disposed about said magnetic shunt elements, magnetic flux generating means disposed about said flux decay retarding means, and polarizing means disposed about said switching means.

7. A relay comprising a first and second switching means, each of said switching means including a first and second fixed contact and an armature positioned to make contact with one or the other of said fixed contacts, magnetic shunt elements disposed about said first and second switching means, flux decay retarding means disposed about said magnetic shunt elements, magnetic flux generating means disposed about said flux decay retarding means, and polarizing means disposed about said switching means.

8. A relay comprising a first and second switching means, each of said switching means including a first and second pair of contacts, magnetic shunt elements disposed about said first and second switching means, flux decay retarding means disposed about said magnetic shunt elements, magnetic flux generating means disposed about said flux decay retarding means, and polarizing means disposed about said switching means.

9. A relay comprising a first and second switching means, each of said switching means including a first and second pair of magnetic members adapted to make contact under the influence of magnetic flux, magnetic flux generating means disposed about said switching means, magnetic flux shunting means disposed about said switching means, and magnetic flux decay retarding means disposed about said switching means.

References Cited in the file of this patent
UNITED STATES PATENTS
2,539,259    McCabe   ---------------- Jan. 23, 1951